(12) United States Patent
Hui et al.

(10) Patent No.: US 10,146,395 B2
(45) Date of Patent: Dec. 4, 2018

(54) QUALITY OF EXPERIENCE DIAGNOSIS AND ANALYSIS IN WIRELESS COMMUNICATIONS

(71) Applicant: T-Mobile USA, Inc., Bellevue, WA (US)

(72) Inventors: Jie Hui, Mercer Island, WA (US); Qi Chen, Ann Arbor, MI (US); Haokun Luo, Redmond, WA (US); Kevin Lau, Issaquah, WA (US); Karthik Iyer, Bellevue, WA (US); Kranthi Sontineni, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 380 days.

(21) Appl. No.: 14/670,160

(22) Filed: Mar. 26, 2015

(65) Prior Publication Data

US 2015/0326455 A1   Nov. 12, 2015

Related U.S. Application Data

(60) Provisional application No. 61/989,510, filed on May 6, 2014.

(51) Int. Cl.
*H04L 12/24* (2006.01)
*G06F 3/0481* (2013.01)
*G06F 3/0484* (2013.01)
*H04L 12/26* (2006.01)

(52) U.S. Cl.
CPC ........ *G06F 3/0481* (2013.01); *G06F 3/04842* (2013.01); *H04L 41/5067* (2013.01); *H04L 43/0852* (2013.01)

(58) Field of Classification Search
CPC combination set(s) only.
See application file for complete search history.

(56) References Cited

U.S. PATENT DOCUMENTS

| 9,064,495 | B1* | 6/2015 | Torok | H04L 43/0852 |
| 2005/0234708 | A1* | 10/2005 | Meehan | G06F 8/20 704/9 |
| 2008/0065734 | A1* | 3/2008 | Yu | H04L 51/24 709/206 |
| 2008/0244062 | A1* | 10/2008 | Elangovan | H04L 67/025 709/224 |
| 2009/0287841 | A1* | 11/2009 | Chapweske | H04L 65/4084 709/231 |
| 2010/0162036 | A1* | 6/2010 | Linden | G06F 11/181 714/4.11 |

(Continued)

OTHER PUBLICATIONS

Quality of Experience for HTTP Adaptive Streaming Services by Oyman et al. IEEE Communication Magazine, Apr. 2012. 8 pages.*

(Continued)

*Primary Examiner* — Hien L Duong
(74) *Attorney, Agent, or Firm* — Han Santos, PLLC (57) ABSTRACT

Techniques described herein provide quality of experience (QoE) diagnosis and analysis for wireless communications. Implementations include generating, by a user device, a user interaction event. The user device may obtain data associated with one or more QoE metrics, and cause analysis on the data associated with the one or more metrics to identify QoE issues.

26 Claims, 6 Drawing Sheets

(56) References Cited

U.S. PATENT DOCUMENTS

| | | | | |
|---|---|---|---|---|
| 2010/0166051 | A1* | 7/2010 | Chung | H04M 3/304 375/225 |
| 2011/0072378 | A1* | 3/2011 | Nurminen | G06F 1/32 715/771 |
| 2012/0173966 | A1* | 7/2012 | Powell | G06Q 30/0241 715/234 |
| 2012/0278698 | A1* | 11/2012 | Hu | G06F 17/30905 715/234 |
| 2013/0219048 | A1* | 8/2013 | Arvidsson | H04L 41/5025 709/224 |
| 2014/0149573 | A1* | 5/2014 | Tofighbakhsh | H04L 41/5067 709/224 |
| 2014/0153392 | A1* | 6/2014 | Gell | H04W 28/0236 370/230 |
| 2014/0155043 | A1* | 6/2014 | Gell | H04W 4/003 455/414.1 |
| 2014/0269269 | A1* | 9/2014 | Kovvali | H04W 24/08 370/229 |
| 2014/0282425 | A1* | 9/2014 | Zhao | G06F 11/3688 717/127 |
| 2014/0297846 | A1* | 10/2014 | Hoja | H04L 43/10 709/224 |
| 2014/0362713 | A1* | 12/2014 | Agarwal | H04W 24/08 370/252 |
| 2015/0032894 | A1* | 1/2015 | Rosensweig | H04L 41/5019 709/226 |
| 2015/0326447 | A1* | 11/2015 | Yoon | H04L 41/5025 709/224 |
| 2016/0072898 | A1* | 3/2016 | Fallon | H04L 47/22 455/414.1 |
| 2016/0112894 | A1* | 4/2016 | Lau | H04W 24/10 370/252 |

OTHER PUBLICATIONS

Activity Testing [online]. Android Developers, Mar. 11, 2014 [retrieved on May 27, 2018]. Retrieved from the Internet: <URL: https://web.archive.org/web/20140311004447/http://developer.android.com/tools/testing/activity_testing.html>.

Aggarwal et al. Prometheus: Toward Quality-of-Experience Estimation for Mobile Apps from Passive Network Measurements [online] Proceedings of the 15th Workshop on Mobile Computing Systems and Applications, Feb. 2014 [retrieved on May 27, 2018]. Retrieved from the Internet: <URL: https://www.researchgate.net/publication/262161353>.

Alexa Top Sites. [online]. Alexa Internet Inc., Apr. 28, 2014 [retrieved on May 27, 2018]. Retrieved from the Internet: <URL: https://web.archive.org/web/20140428010924/http://www.alexa.com/topsites>.

Azim, Tanzirul and Iulian Neamtiu. Targeted and Depth-first Exploration for Systematic Testing of Android Apps [online] Proceedings of OOPSLA '13, Oct. 2013 [retrieved on May 27, 2018]. Retrieved from the Internet: <URL: http://citeseerx.ist.psu.edu/viewdoc/download?doi=10.1.1.641.8441&rep=rep1&type=pdf>.

Balachandran et al. Developing a Predictive Model of Quality of Experience for Internet Video [online] Proceedings of ACM SIGCOMM '13, Aug. 2013 [retrieved on May 27, 2018]. Retrieved from the Internet: <URL: https://www.cs.cmu.edu/~srini/papers/2013.Balachandran.sigcomm.pdf>, pp. 339-350.

Carbone, Marta and Luigi Rizzo. Dummynet Revisited [online] ACM SIGCOMM Computer Communication Review, vol. 40, Issue 2 (Apr. 2010) [retrieved on May 27, 2018]. Retrieved from the Internet: <URL: http://ccr.sigcomm.org/online/files/p13-15v40n2e-carboneA.pdf>, pp. 13-20.

Carroll, Aaron and Gernot Heiser. An Analysis of Power Consumption in a Smartphone [online] Proceeding USENIXATC'10 Proceedings of the 2010 USENIX conference on USENIX annual technical conference, Jun. 2010 [retrieved on May 27, 2018]. Retrieved from the Internet: <URL: https://www.usenix.org/legacy/event/atc10/tech/full_papers/Carroll.pdf>, pp. 12-21.

Chen et al. Quantifying Skype User Satisfaction ACM SIGCOMM Computer Communication Review—Proceedings of the 2006 conference on Applications, technologies, architectures, and protocols for computer communications, vol. 36, Issue 4 (Oct. 2006), pp. 399-410.

Comparing Traffic Policing and Traffic Shaping for Bandwidth Limiting [online]. Cisco, Aug. 8, 2005 [retrieved on May 27, 2018]. Retrieved from the Internet: <URL: https://www.scribd.com/document/54710886/Comparing-Traffic-Policing-and-Traffic-Shaping-for-Bandwidth-Limiting>.

Global Internet Phenomena Report [online]. Sandvine Incorporated ULC, Nov. 8, 2013 [retrieved on May 27, 2018]. Retrieved from the Internet: <URL: https://www.sandvine.com/hubfs/downloads/archive/2013-2h-global-internet-phenomena-report.pdf>.

Hao et al. PUMA: Programmable UI-Automation for Large-Scale Dynamic Analysis of Mobile Apps [online] Proceedings of the 12th annual international conference on Mobile systems, applications, and services (MobiSys '14), Jun. 2014 [retrieved on May 27, 2018]. Retrieved from the Internet: <URL: https://www.microsoft.com/en-us/research/wp-content/uploads/2016/02/PUMA-Mobisys2014.pdf>, pp. 204-217.

Huang et al. A Close Examination of Performance and Power Characteristics of 4G LTE Networks [online] Proceedings of the 10th annual international conference on Mobile systems, applications, and services (MobiSys '12), Jun. 2012 [retrieved on May 27, 2018]. Retrieved from the Internet: <URL: http://www-personal.umich.edu/~hjx/file/mobisys12.pdf>, pp. 225-238.

Huang et al. An In-depth Study of LTE: Effect of Network Protocol and Application Behavior on Performance [online] Proceedings of the ACM SIGCOMM 2013 Conference, Aug. 2013 [retrieved on May 27, 2018]. Retrieved from the Internet: <URL: https://conferences.sigcomm.org/sigcomm/2013/papers/sigcomm/p363.pdf>, pp. 363-374.

Ickin et al. Factors influencing quality of experience of commonly used mobile applications IEEE Communications Magazine, vol. 50, Issue 4 (2012), pp. 48-56.

Joumblatt et al. Predicting User Dissatisfaction with Internet Application Performance at End-Hosts [online] Proceedings of IEEE INFOCOM, Apr. 2013 [retrieved on May 27, 2018]. Retrieved from the Internet: <URL: https://pdfs.semanticscholar.org/f74b/018eff817e723530f26486488baca01cb027.pdf>.

Lake, Chris. Pre-roll video ads: is it an wonder why we hate them? [online]. Econsultancy.com Limited, Aug. 22, 2013 [retrieved on May 27, 2018]. Retrieved from the Internet: <URL: https://econsultancy.com/blog/63277-pre-roll-video-ads-is-it-any-wonder-why-we-hate-them#i.9gohovetnegyqcc>.

Lee et al. Verifying User Interface Properties for Vehicular Applications Proceedings of the 11th annual international conference on Mobile systems, applications, and services (MobiSys '13), Jun. 2013, pp. 1-12.

Liang et al. Contextual Fuzzing: Automated Mobile App Testing Under Dynamic Device and Environment Conditions [online] Technical Report. Microsoft Research, 2013 [retrieved on May 27, 2018]. Retrieved from the Internet: <URL: https://www.microsoft.com/en-us/research/wp-content/uploads/2017/05/convirt_tr.pdf>.

Liu et al. DECAF: Detecting and Characterizing Ad Fraud in Mobile Apps [online] Proceedings of the 11th USENIX Conference on Networked Systems Design and Implementation, Apr. 2014 [retrieved on May 27, 2018]. Retrieved from the Internet: <URL: https://www.usenix.org/system/files/conference/nsdi14/nsdi14-paper-liu_bin.pdf>, pp. 57-70.

Logcat [online]. Android Developers, Mar. 22, 2014 [retrieved on May 27, 2018]. Retrieved from the Internet: <URL: https://web.archive.org/web/20140322071546/http://developer.android.com/tools/help/logcat.html>.

MacHiry et al. Dynodroid: An Input Generation System for Android Apps [online] Proceedings of the 2013 9th Joint Meeting on Foundations of Software Engineering, Aug. 2013 [retrieved on May 27, 2018]. Retrieved from the Internet: <URL: http://cercs.gatech.edu/tech-reports/tr2012/git-cercs-12-09.pdf>.

(56) References Cited

OTHER PUBLICATIONS

MediaPlayer [online]. Android Developers, Apr. 23, 2014 [retrieved on May 27, 2018]. Retrieved from the Internet: <URL: https://web.archive.org/web/20140423133709/http://developer.android.com/reference/android/media/MediaPlayer.html>.
Pathak et al. Where is the energy spent inside my app?: fine grained energy accounting on smartphones with Eprof [online] Proceedings of the 7th ACM european conference on Computer Systems, Apr. 2012 [retrieved on May 27, 2018]. Retrieved from the Internet: <URL: https://epic.org/privacy/location/Smartphone%20batter%20life%20and%20apps.pdf>, pp. 29-42.
Perez, Sarah. Mobile App Usage Increases in 2014, As Mobile Web Surfing Declines [online]. TechCrunch.com, Apr. 1, 2014 [retrieved on May 27, 2018]. Retrieved from the Internet: <URL: https://techcrunch.com/2014/04/01/mobile-app-usage-increases-in-2014-as-mobile-web-surfing-declines/>.
Power Monitor [online]. Monsoon Solutions, Inc., Jul. 30, 2013 [retrieved on May 27, 2018]. Retrieved from the Internet: <URL: https://web.archive.org/web/20130730131544/http://www.msoon.com/LabEquipment/PowerMonitor/>.
Qian et al. Characterizing radio resource allocation for 3G networks [online] Proceedings of the 10th ACM SIGCOMM conference on Internet measurement, Nov. 2010 [retrieved on May 27, 2018]. Retrieved from the Internet: <URL: http://conferences.sigcomm.org/imc/2010/papers/p137.pdf>, pp. 137-150.
Qian et al. Periodic transfers in mobile applications: network-wide origin, impact, and optimization [online] Proceedings of the 21st international conference on World Wide Web, Apr. 2012 [retrieved on May 27, 2018]. Retrieved from the Internet: <URL: http://www-personal.umich.edu/~hjx/file/www12.pdf>, pp. 51-60.
Qian et al. Profiling Resource Usage for Mobile Applications: A Cross-layer Approach [online] Proceedings of the 9th international conference on Mobile systems, applications, and services (MobiSys '11), Jun. 2011 [retrieved on May 27, 2018]. Retrieved from the Internet: <URL: https://web.eecs.umich.edu/~zmao/Papers/aro_mobisys11.pdf>, pp. 321-334.
Qian et al. TOP: Tail Optimization Protocol For Cellular Radio Resource Allocation 18th IEEE International Conference on Network Protocols (ICNP), Oct. 2010.
QXDM Professional™ Qualcomm eXtensible Diagnostic Monitor: Proven Diagnostice Tool for Evaluating Handset and Network Performance [online]. Qualcomm, 2012 [retrieved on May 27, 2018]. Retrieved from the Internet: <URL: https://www.scribd.com/document/104016049/Qualcomm-eXtensible-Diagnostic-Monitor>.
Rastogi et al. AppsPlayground: Automatic Security Analysis of Smartphone Applications [online] Proceedings of the third ACM conference on Data and application security and privacy, Feb. 2013 [retrieved on May 27, 2018]. Retrieved from the Internet: <URL: https://www.cs.northwestern.edu/~ychen/Papers/AppsPlayground.pdf>, pp. 209-220.
Ravindranath et al. AppInsight: Mobile App Performance Monitoring in the Wild [online] Proceedings of Operating Systems Design and Implementation, 2012 [retrieved on May 27, 2018]. Retrieved from the Internet: <URL: https://www.usenix.org/system.files/conference/osdi12.osdi12-final-91.pdf.
Ravindranath et al. Automatic and Scalable Fault Detection for Mobile Applications [online] Technical Report MSR-TR-2013-98. Microsoft Research, Aug. 2013 [retrieved on May 27, 2018]. Retrieved from the Internet: <URL: https://www.microsoft.com/en-us/research/publication/automatic-and-scalable-fault-detection-for-mobile-applications/>.
Ravindranath et al. Timecard: Controlling User-Perceived Delays in Server-Based Mobile Applications [online]. Proceedings of the Twenty-Fourth ACM Symposium on Operating Systems Principles (SOSP '13), Nov. 2013 [retrieved on May 27, 2018]. Retrieved from the Internet: <URL: http://cocoa.lcs.mit.edu/papers/sosp13.pdf>, pp. 35-100.
Reed, Brad. T-Mobile's next move: Shame AT&T and Verizon into ditching data overage fees [online]. BGR Media, Apr. 9, 2014 [retrieved on May 27, 2018]. Retrieved from the Internet: <URL: http://bgr.com/2014/04/09/t-mobile-vs-att-vs-verizon-data-overage-fees/>.
Schatz et al. Passive YouTube QoE Monitoring for ISPs [online] Sixth International Conference on Innovative Mobile and Internet Services in Ubiquitous Computing, Jul. 2012 [retrieved on May 27, 2018]. Retrieved from the Internet: <URL: https://pdfs.semanticscholar.org/7952/f6d3867a0702b8e1577e9044b71e9ae3b3c3.pdf>.
Shi et al. CoAST: Collaborative Application-Aware Scheduling of Last-Mile Cellular Traffic [online] Proceedings of the 12th annual international conference on Mobile systems, applications, and services, Jun. 2014 [retrieved on May 27, 2018]. Retrieved from the Internet: <URL: http://tns.thss.tsinghua.edu.cn/~jiliang/files/20150402_CoAST_Paper.pdf>, pp. 245-258.
TCPDUMP & LIBPCAP [online]. Tcpdump/Libcap, Mar. 29, 2014 [retrieved on May 27, 2018]. Retrieved from the Internet: <URL: https://web.archive.org/web/20140329064318/http://www.tcpdump.org:80/>.
Tu et al. Accounting for Roaming Users on Mobile Data Access: Issues and Root Causes [online] Proceeding of the 11th annual international conference on Mobile systems, applications, and services, Jun. 2013 [retrieved on May 27, 2018]. Retrieved from the Internet: <URL: http://metro.cs.ucla.edu/papers/mobisys13.pdf>, pp. 305-318.
Universal Mobile Telecommunications System (UMTS): Radio Link Control (RLC) Protocol Specification, 3GPP TS 25.32, Version 11.1.0, Release 11 [online]. ETSI.org, Jan. 2013 [retrieved on May 27, 2018]. Retrieved from the interent: <URL: http://www.etsi.org/deliver/etsi_ts/125300_125399/125322/11.01.00_60/ts_125322v110100p.pdf>.
Vallina-Rodriguez et al. RILAnalyzer: a Comprehensive 3G Monitor On Your Phone [online] Proceedings of the 2013 conference on Internet measurement conference, Oct. 2013 [retrieved on May 27, 2018]. Retrieved from the Internet: <URL: https://www.ict-mplane.eu/sites/default/files/public/publications/561imc117-vallinaps.pdf>, pp. 257-264.
Winstein et al. Stochastic Forecasts Achieve High Throughput and Low Delay over Cellular Networks [online] Proceedings of the 10th USENIX conference on Networked Systems Design and Implementation, Apr. 2013 [retrieved on May 27, 2018]. Retrieved from the Internet: <URL: https://www.usenix.org/system/files/conference/nsdi13/nsdi13-final113.pdf>, pp. 459-472.
Xu et al. PROTEUS: Network Performance Forecast for Real-Time, Interactive Mobile Applications [online] Proceeding of the 11th annual international conference on Mobile systems, applications, and services, Jun. 2013 [retrieved on May 27, 2018]. Retrieved from the Internet: <URL: http://citeseerx.ist.psu.edu/viewdoc/download?doi=10.1.1.464.987&rep=rep1&type=pdf>, pp. 347-360.
Zhang et al. Panappticon: Event-based Tracing to Measure Mobile Application and Platform Performance [online] Proceedings of the Ninth IEEE/ACM/IFIP International Conference on Hardware/Software Codesign and System Synthesis, Sep. 2013 [retrieved on May 27, 2018]. Retrieved from the Internet: <URL: http://www.pdinda.org/Papers/codes13.pdf>.

\* cited by examiner

QUALITY OF EXPERIENCE DIAGNOSIS AND ANALYSIS IN WIRELESS COMMUNICATIONS

CROSS REFERENCE TO RELATED PATENT APPLICATIONS

This application claims priority to U.S. Provisional Patent Application No. 61/989,510, filed on May 6, 2014, entitled "Quality of Experience Distributed Mobile Testing Application Controller and Techniques," which is hereby incorporated by reference in its entirety.

BACKGROUND

Mobile devices have become increasingly prevalent and important in our daily lives. Today's mobile devices are often equipped with processors that may perform many tasks, such as recording data, playing media, and performing other tasks using various mobile applications. However, there are many factors that affect the users' expectations with respect to the performance of the mobile applications. It still remains a challenging task to identify these factors and effectively and systematically study users' expectations of mobile applications. This challenging task is largely due to limited insight into the complex multi-layer dynamics of a wireless communication system.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Users of mobile phones would like mobile applications to respond quickly and to consume less mobile data as well as use less power. The degree to which mobile applications meet users' expectations is referred to as quality of experience (QoE). Ensuring good QoE is desirable for mobile application developers, network service providers, and phone manufacturers. However, it remains a challenging task to effectively and systematically study QoE of mobile applications, such as Facebook® and YouTube®. Also, mobile application QoE may be affected by factors impacting various layers of a network system. This further complicates the QoE analysis.

Conventional techniques are either costly in human effort or less able to control user behavior variations. For example, conventional techniques may require application source codes to log user interface (UI) events. Such requirement limits applicability of these techniques. Implementations herein provides techniques to support accurate, systematic, and repeatable measurements and analysis of mobile application QoE. The techniques may be implemented by a user device to simulate user behavior, such as posting a status on a mobile application. The user device may then measure user-perceived latency directly through UI changes associated with the mobile application on the screen of the user device. The techniques enable the simulation of user interactions with a mobile application and the measurement of QoE without accessing the application source code of the mobile application, modify the application logic of the mobile application, or using an external device to trigger interactions with the mobile application. In addition to QoE measurements, the user device may also support cross-layer analysis covering the application layer, transport layer, network layer, and radio link layer to study root causes of QoE issues, which may be caused by network activities and/or device-specific operations.

Illustrative Environment

Figure 1:
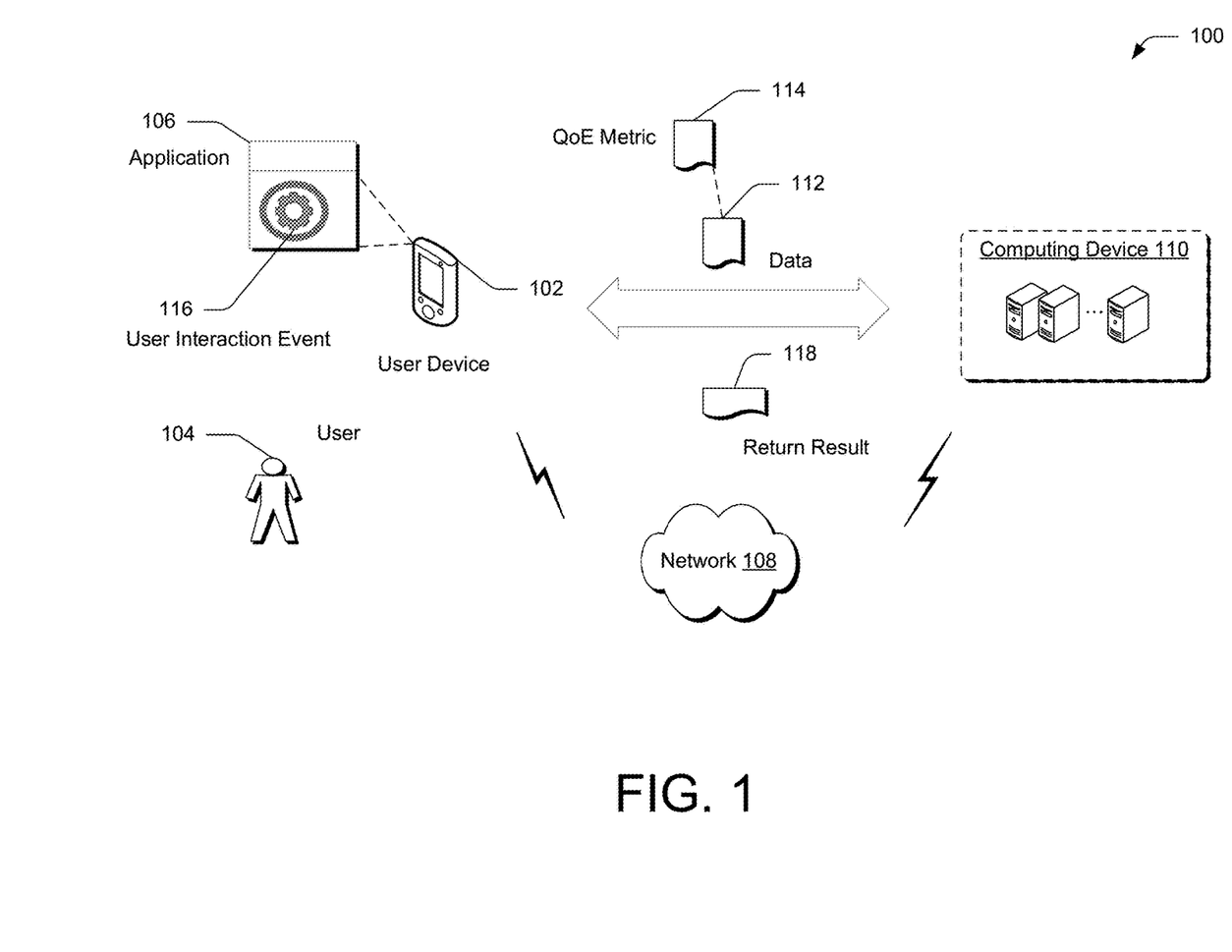
FIG. 1 is a diagram of an illustrative telecommunication environment that enables quality of experience (QoE) diagnosis and analysis of an application in a wireless communication.

FIG. 1 is a diagram of an illustrative telecommunication environment that enables QoE diagnosis and analysis of an application in a wireless communication. The environment 100 includes a user device 102 associated with a user 104. The articles "a" and "an" are used herein to refer to one or to more than one (i.e. to at least one) of the grammatical object of the article. By way of example, "a user" means one user or more than one users. The user device 102 includes any type of device having a component for communicating with one or more other devices via one or more communication channels including, for example, wireless communication channels, such as infra-red, radio frequency (RF), optical, terrestrial, satellite communication media, and wired communication channels, such as copper wires, coaxial cables, Fiber-optic cables. Examples of the user device 102 may include mobile telephones/smartphones, netbooks, tablet computers, personal computers, data sticks, network adapters, and other electronic devices that may exchange signals with other devices, such as radio signals.

In some implementations, the user device 102 may implement an application 106 to collect QoE data in response to a user interaction event 116. The user interaction event 116 may include an action or occurrence indicating that one or more user interactions have happened on the user device 102, such as a keystroke or a mouse click. For example, the application 106 may generate the user interaction event 116, and collect data associated with a QoE metric. The application 106 may further cause analysis of the collected data to identify a QoE issue. For example, the user device 102 may perform preliminary analysis on the data to identify the QoE issue.

In some implementations, the user device 102 may transmit data 112, such as the collected data, to a computing device 110 to perform root-cause analysis. In these instances, the user device 102 may exchange data, such as the data 112 including QoE metric 114 and a return result 118 with the computing device 110 through a network 108. The network 108 may include a plurality of hardware, software, and other infrastructure. The network 108 may include wired and/or wireless networks that enable communications between the various computing devices described in the environment 100. In some implementations, the network 108 may include local area networks (LANs), wide area networks (WAN), mobile telephone networks (MTNs), and other types of networks, possibly used in conjunction with one another, to facilitate communication between the various computing devices.

Illustrative Architectures

Figure 2:
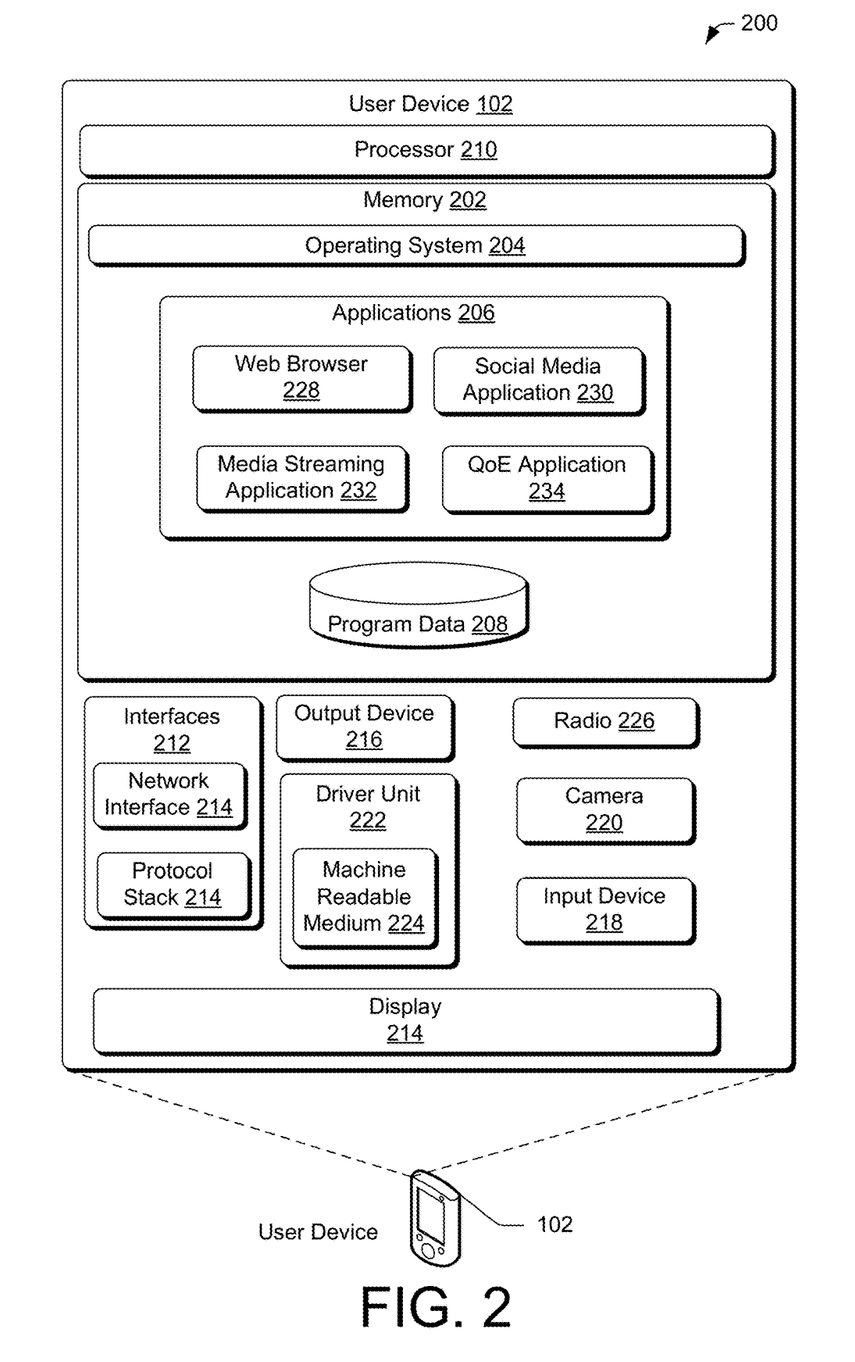
FIG. 2 is a schematic diagram of an illustrative computing architecture that enables quality of experience (QoE) diagnosis and analysis of an application in a wireless communication.

FIG. 2 a schematic diagram of an illustrative computing architecture that enables quality of experience (QoE) diagnosis and analysis of an application in a wireless communication. The computing architecture 200 shows additional details of at least one portion of the user device 102, which may include additional modules, kernels, data, and/or hardware.

In some implementations, the user device 102 may include a memory 202, the memory storing an operating system (OS) 204, the applications 206, program data 208, and/or other component. The user device 102 may further include a processor 210, interfaces 212, a display 214, output devices 216, input devices 218, a camera 220, and drive unit 222, which may include a machine readable medium 224. The user device 102 may further include a radio 226. In some implementations, the processor 210 is a central processing unit (CPU), a graphics processing unit (GPU), or both CPU and GPU, or other processing unit or component known in the art.

In various implementations, memory 202 generally includes both volatile memory and non-volatile memory. Such as RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium. Additionally, in some implementations, memory 202 includes a SIM (subscriber identity module) card, which is a removable memory card used to identify a user of the user device 102 to a service provider network.

Memory 202 may further be described as computer storage media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the user device 102. Any such computer storage media may be part of the user device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

In various implementations, the interfaces 212 may include various types of interfaces. For example, the interfaces 212 include any one or more of an Ethernet interface, wireless local area network (LAN) interface, a near field interface, a DECT chipset, or an interface for an RJ-11 or RJ-42 port. The wireless LAN interface may include a Wi-Fi interface or a Wi-Max interface, or a Bluetooth interface that performs the function of transmitting and receiving wireless communications using, for example, the IEEE 802.11, 802.16 and/or 802.20 standards. For instance, the user device 102 may use a Wi-Fi interface to communicate directly with a nearby device. The near field interface may include a Bluetooth® interface or radio frequency identifier (RFID) for transmitting and receiving near field radio communications via a near field antenna. For example, the near field interface may be used for functions, as is known in the art, such as communicating directly with nearby devices that are further, for instance, Bluetooth® or RFID enabled. A reader/interrogator may be incorporated into user device 102.

In various implementations, the display 214 is a liquid crystal display or any other type of display commonly used in telecommunication devices. For example, display 214 may be a touch-sensitive display screen, and may then further act as an input device or keypad, such as for providing a soft-key keyboard, navigation buttons, or the like.

In some implementations, the output devices 216 include any type of output devices, such as the display 214, speakers, a vibrating mechanism, or a tactile feedback mechanism. The output devices 216 further include ports for one or more peripheral devices, such as headphones, peripheral speakers, or a peripheral display.

In various implementations, the input devices 218 include any type of input devices. For example, the input devices 218 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may further include a joystick-like controller and/or designated navigation buttons, or the like.

The machine readable medium 224 stores one or more sets of instructions, such as software, embodying any one or more of the methodologies or functions described herein. The instructions may further reside, completely or at least partially, within the memory 202 and within the processor 210 during execution thereof by the user device 102. Portions of the memory 202, as accessed by the processor 210, may further constitute machine readable media 224.

The memory 202 may store various applications, such as a web browser 228, a social media application 230, a media streaming application 232, and/or a QoE application 234. The web browser 228 may include a computer program that enables the user 104 to read, for example, hypertext in files or on the World Wide Web (WWW). For example, the Web browser 228 includes Firefox®, Chrome®, Safari®, or Internet Explorer®. The social media application 230 may include a computer program that enables the user 104 to create and/or exchange user-generated or user-initiated content. For example, the social media application 230 includes Facebook® and Google+®. The media streaming application 232 may include a computer program that enables the user 104 to constantly receive and consume content, such as multimedia content. For example, the streaming application 232 may be YouTube® or Netflix®.

In some implementations, the QoE application 234 may generate the user interaction event 116 associated with the user device 102 engaged in a wireless communication. The user interaction event 116 may refer to an action or occurrence indicating that one or more user interactions have happened on the user device 102, such as a keystroke or a mouse click.

After generating the user interaction event 116, the QoE application 234 may collect data associated with one or more QoE metrics at one or more layers of a protocol stack of the user device 102. QoE metrics, such as the QoE metric 114, may refer to the metrics used to judge the quality of received services, such as web browsing, phone calls or media streaming. The QoE metrics may be subjective or objective, and may include a QoE score or a service performance metric. For example, the user 104 may be asked to provide a QoE score indicating the user's service experience. In some instances, the service performance metrics may be related to user satisfaction, such as the number of stalls that occurred when the user 104 is watching a video.

In some implementations, the one or more QoE metrics may include various QoE metrics at one or more abstraction levels of a communication protocol stack of the user device 102. In some instances, the one or more layers may include an application layer of the protocol stack of the user device 102 and at least one of a session transport layer, a network layer, or a data link layer of the protocol stack of the user device 102. The link layer may include a radio resource control (RRC) layer and/or a radio link control (RLC) layer of the protocol stack of the user device 102.

In some implementations, the one or more QoE metric may include a user-perceived latency at an application layer. For example, the QoE application 234 may simulate the user interaction and measure the user-perceived latency corresponding to the user interaction based on a time associated with the UI response.

The user-perceived latency may include the time that the user 104 spends on waiting for a UI response from an application of the applications 206 in response to the user interaction event 116. For example, the user-perceived latency may include a web page loading time in the web browser 228, a posting upload time in the social media application 230, or a stall time in the media streaming application 232. In some instances, the data associated with the one or more QoE metrics may include a start time of the user interaction event 116 and an end time of the user interaction event 116.

In some implementations, the one or more QoE metrics may include a cellular data consumption corresponding to the user interaction event 116. The cellular data consumption may include an amount of cellular network data consumed by an application of the applications 206 or by the user device 102 in response to the user interaction event 116.

In some implementations, the one or more QoE metrics may include energy consumption corresponding to the user interaction event 116. The energy consumption may include an amount of energy usages by an application of the applications 206 or the user device 102 in response to the user interaction event 116.

In some implementations, the QoE application 234 may parse a packet trace file to extract one or more transmission control protocol (TCP) flows associated with an application of the applications 206. Based on the extracted one or more TCP flows, the QoE application 234 may determine the cellular data consumption of the application on the user device 102. In some implementations, the QoE application 234 may collect information of changes among power consumption states of the user device 102. Based on the collected information, the QoE application may determine the energy consumption by the application. In some instances, the energy consumption may include a network energy consumption by the application on the user device in response to the user interaction event 116.

In some implementations, the QoE application 234 may monitor a plurality of user interactions on the application, and collect data on the one or more QoE metrics that correspond to the plurality of user interactions.

The QoE application 234 may generate analysis of the collected data to identify one or more QoE issues. For example, the QoE application 234 or another application resident on the user device 102 may perform preliminary analysis on the data to identify the one or more QoE issues. In some instances, the user device 102 may transmit the collected data to the computing device 110 to perform root-cause analysis cross multilayers of the protocol stack of the user device 102. For example, the QoE application 234 may cause analysis of the data of the one or more QoE metrics in the application layer and transport layer of the protocol stack of the user device 102.

In some implementations, the one or more QoE issues are associated with at least one of an application development of the application, a configuration of the application, a configuration of a network associated with the wireless communication, or a configuration of the user device 102.

In some implementations, the QoE application 234 may generate a recommendation for resolving QoE issues, or generate a representation of the one or more QoE metrics. For example, recommendations may include changing a video frame rate, changing an audio bitrate, change image resolution, turning on or off adaptive bitrate streaming, increasing or decrease the size of a multimedia data buffer, restarting one or more communication services or applications of the computing device to clear an application error, and/or so forth. In some implementations, the QoE application 234 may determine, based on the one or more QoE metrics, a QoE score for performance of the application in response to the user interaction event 116. In response to a determination that the QoE score is less than a predetermined value, the QoE application may generate a notification and present the notification to the user 104.

Figure 3:
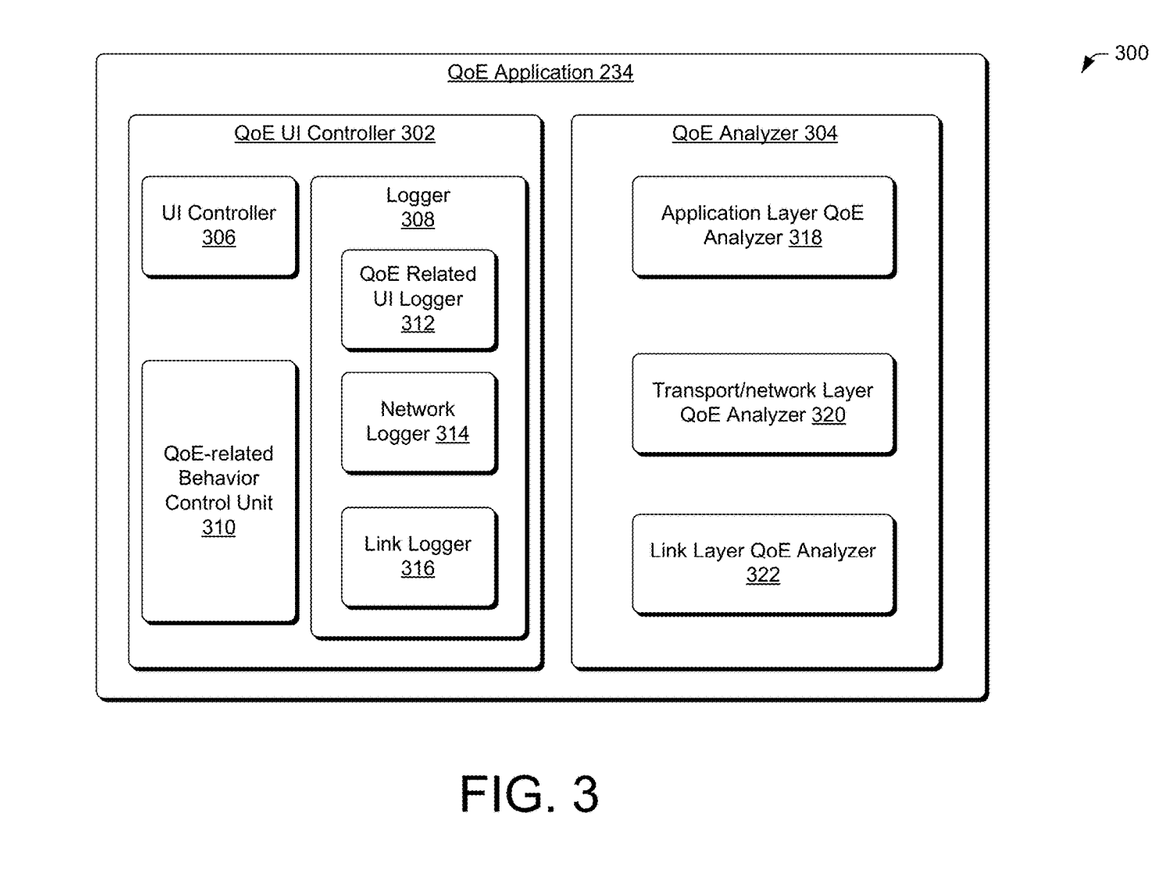
FIG. 3 is a schematic diagram of an illustrative computing scheme that measures and analyzes QoE of an application in a wireless communication.

FIG. 3 is a schematic diagram of an illustrative computing scheme that measures and analyzes QoE of an application in a wireless communication. The scheme 300 includes various components of QoE application 234, such as a QoE UI controller 302 and a QoE analyzer 304. The QoE UI controller 302 may implement UI control techniques to drive the applications 206 to automatically simulate user behavior traces. For example, the QoE UI controller 302 may collect the corresponding QoE data at least at an application layer, a transport layer, a network layer, or a cellular radio link layer associated with the user device. In some instances, the QoE UI controller 302 may enable efficient collection of QoE data and control QoE measurements without depending on varying user behavior. In some instance, UI control techniques implemented by the QoE UI controller 302 may not need access to application source codes of the applications 206. At the UI layer of the user device 102, to collect data of user-perceived latency, the QoE UI controller 302 may support direct access to an UI layout tree, which describes an UI of an application of the applications 206 on the screen of the user device 102 in real time. Accordingly, the QoE UI controller 302 may record the time of a UI change. In some instances, the QoE UI controller 302 may implement a command-line packet analyzer, such as Tcpdump, to collect network data, and a cellular radio link layer diagnosing tool may be used to collect RRC and RLC data associated with the wireless communication that is being performed by the user device 102.

The QoE UI controller 302 may include various components, such as a UI controller 306, a logger 308, and/or a QoE related behavior control unit 310. The logger 308 may further include a QoE related UI logger 312, a network logger 314, and/or a link logger 316. In some embodiments, the UI controller 306 may initiate a UI interaction, such as button clicks, and control an application of the applications 206 to perform user behaviors of interest. The UI controller 306 may allow the same set of standardized user interactions to be simulated without human interactions. For example, the UI controller 306 may control the UI of the application through an application programming interface (API), such as InstrumentationTestCase API provided by the Android® system for UI testing during application development. The API allows UI interaction events to be sent to the QoE application 234.

In some embodiments, the UI controller 306 may implement a see-interact-wait paradigm. For example, after launching the application, the see component of the UI controller 306 may parse UI data of the application shown on the screen of the user device 102. Then, the interact component of the UI controller 306 may choose a UI element to interact with, for example, by clicking a button or scrolling a Web page. After the interaction, the wait component of the UI controller 306 may wait for the corresponding an UI response. The see-interact-wait paradigm follows natural user-app interaction behavior, and allows the user device 102 to simulate user behavior. Using the API, the UI controller 306 may be launched in the same process as the application to allow direct access to the UI data for the see and wait components. Unlike conventional techniques that require system instrumentation or UI dump tools, implementations herein provides direct UI data sharing and enables convenient and accurate latency measurements in response to UI changes.

In the see-interact-wait paradigm, the wait component may measure a user-perceived latency associated with the user interaction event 116. In some instances, the user-perceived latency may include the time between triggering a UI interaction event and receiving a corresponding response. Thus, the logger 308 may log start and end times of the waiting process to measure user-perceived latency. In some instances, the waiting process may be triggered by the user 104, such as uploading a post in the social media application 230. For example, to log the start time, the logger 308 may log the time when the UI controller 306 triggers a user action. In some instances, the waiting process may be triggered by a certain event of the application, such as a video stall. For example, to log the start time, the logger 308 may log the time when the waiting process indicator, for example a progress bar, shows up. For the end time, the logger 308 may log the time when the wait-ending UI indicator occurs, for example the progress bar's disappearance. Because the UI controller 306 shares the same process as the application of the applications 206, these UI element events may be monitored directly.

In some implementations, QoE-related user behavior may be identified along with the corresponding user interaction sequences. Based on the interaction sequences, control specifications may be generated for a logic implementation of the QoE UI control 302. In some instances, techniques, such as view signature, may be implemented to ensure that the user interactions are sent to the right UI elements during the simulation of user behavior. The view signature may describe layout characteristics in the UI layout tree. For example, the view signature includes the UI element class name, layout ID, and a description added by a developer.

In some implementations, the QoE related behavior control unit 310 may enable collection of metric data, for example a user-perceived latency for an application of the applications 206. Table 1 summarizes the QoE related user behavior that the QoE application 234 simulates and the corresponding user-perceived latency.

TABLE 1

| Application | User behavior to simulate | User-perceived latency to measure | UI Events to monitor for latency measurement | |
|---|---|---|---|---|
| | | | Measurement start time | Measurement end time |
| Social media application 230 | Upload post | Post uploading time | Press "post" button | Posted content shown in ListView |
| | Pull-to-update | News feed list updating time | Progress bar appears | Progress bar disappears |
| Media streaming application 232 | Watch video | Initial loading time | Click on the video entry | Progress bar disappears |
| | | Re-buffering time | Progress bar disappears | Progress bar disappears |
| Web browser 228 | Load web page | Web page loading time | Press ENTER in URL bar | Progress bar disappears |

In some implementations, for the social media application 230, the QoE application 234 may measure various behavior, such as uploading a post and updating news feed. One of common user actions on the social media application 230 is to post an update, for example, posting a status, check-in, and uploading a photo. For these actions, the user-perceived latency may include the time from when a "post" button is clicked to the time when a posted item is shown on a news feed list. To measure the ending time, a timestamp string in the post may be retrieved. After the "post" button is clicked, the QoE application 234 may repeatedly parse the UI layout tree and log the end timestamp as the time when an item with the timestamp string appears in a social media feed list.

Another common user action on the social media application 230 is to pull the news feed list down to update it by a pulling gesture. In these instances, the QoE application 234 may generate a scrolling down gesture. In some instances, a user action on Social media application 230 is to pull the news feed list down to update it by passively waiting for the social media application 230 to update the news feed list. In these instances, the QoE application 234 may wait on the news feed list and to log the appearance and disappearance time of the loading progress bar for the news feed list.

In some implementations, for the media streaming application 232, the QoE application 234 may simulate searching for a video by a name of the video and then watching the video. To simulate the user behavior of watching, the QoE application 234 may take as input a list of video names. The QoE application 234 may search for the video and play the video until the video finishes.

There are two user-perceived latency metrics that the QoE application 234 monitors an initial loading time and a rebuffering ratio. The rebuffering ratio is the ratio of time spent stalling to the sum of total play and stall time after an initial loading. For the initial loading time, the QoE application 234 may measure when the UI controller 306 clicks on a video entry in the search results. The QoE application 234 may finish measuring when the loading progress bar disappears. For the rebuffering ratio, the QoE application 234 may parse the UI layout tree after the video starts playing, and log when the progress bar appears and disappears as the video rebuffering start timestamp and end timestamp.

In some instances, when an advertisement is shown before the video, the QoE UI controller 302 may measure the initial loading time and rebuffering ratio for the advertisement and the actual video, respectively.

In some implementations, for the web browser 228, the QoE application 234 may simulate loading a web page using the web browser 228. For the web browser 228, a QoE metric may include the web page loading time. To simulate page loading, the QoE application 234 may take a file with a list of URL strings as input, and enter each URL into the URL bar of the browser app line by line before submitting the URL. The QoE application 234 may log the ENTER key sending time as the start time, and monitor the progress bar in the UI layout tree to determine when the loading completes. In some instances, the QoE application 234 may determine the loading complete time by logging the time when the visible parts on the page are loaded. For example, the QoE application 234 may capture a video of the screen and then analyze the video frames as implemented in a speed Index metric.

In some embodiments, when simulating user behavior to measure QoE metrics, the QoE application 234 may collect data at multiple layers of the user device 102 during a wireless communication. For example, the QoE application 234 may collect application layer QoE data during the user behavior simulation. For example, the QoE application 234 may generate a log file, which records individual user interaction events sent to the QoE application 234. The log file may include the start and end timestamps to calculate a corresponding user-perceived latency.

In some implementations, the QoE application 234 may collect may collect transport/network layer data to measure mobile data consumption and to help identify root causes of QoE issues for multiple layers. For example, the QoE application 234 may collect traffic logs at the transport and network layers using a command-line packet analyzer during the user behavior simulation.

In some implementations, the QoE UI controller 302 may collect RRC/RLC layer data using a cellular network diagnosis tool. For example, the tool may provide real-time access to RRC and RLC layer information. To collect RLC data using the tool, the user device 102 may be connected another computing device to save radio link layer information to a file on the other computing device. In some instances, the RRC state transitions and RLC protocol data units (PDUs) with corresponding timestamps may be isolated.

After collected data associated with QoE metrics, the QoE analyzer 304 may cause analysis of the QoE metrics to identify QoE issues. The QoE analyzer 304 may include various components, such as an application layer QoE analyzer 318, a transport/network layer QoE analyzer 320, and/or a link layer QoE analyzer 322.

At the application layer of the user device 102, the application layer QoE analyzer 318 may calculate the user-perceived latency metrics based on the start and end timestamps logged by the logger 308. Conventional techniques may infer UI latency from network traces Implementations herein may calculate UI latency directly from corresponding start and end timestamps such that an application having encrypted traffic, such as Facebook®, may be analyzed.

In some implementations, user-perceived latency calibration may be performed. For example, the application layer QoE analyzer 318 may measure user-perceived latency by observing application-generated UI events and periodically parsing the UI layout tree. At the transport and network layers, QoE metrics associated with mobile data consumption may be determined from data collected by a command-line packet analyzer. The transport/network layer QoE analyzer 320 may parse the raw packet trace and extract TCP flows, defined by the tuple {srcIP, srcPort, dstIP, dstPort}, and then associate each TCP flow with the server's URL by parsing the Domain Name System (DNS) lookups in the trace. For example, the TCP flows with common server URLs may be identified to associate the simulated user behavior, and then the QoE analyzer 320 may use the TCP flows to calculate network data consumption. In some instances, the transport/network layer QoE analyzer 320 may also calculate the number of data retransmissions, the Round-Trip Time (RTT), and the throughput for the TCP flows.

At a RRC/RLC Layer, the link layer QoE analyzer 322 may obtain RRC state change information from, for example, Qualcomm Extensible Diagnostic Monitor (QxDM) logs. For example, link layer QoE analyzer 322 may obtain a power level for each RRC state, and thus calculate network energy consumption for the entire mobile device. To obtain network energy consumed by an application of the applications 206, applications except for the application resident on the user device 102 may be disable such that that the network energy calculation is not affected by unrelated traffic. QxDM logs may include uplink and downlink RLC PDUs, which include polling PDUs and the corresponding STATUS PDUs. Based on this feedback loop, the application 106 may calculate the first-hop OTA (Over the Air) RTT, which is the time from when the user device 102 transmits a polling request until when the user device 102 receives the STATUS PDU. In these instances, the first-hop OTA RTT for a PDU may be estimated by finding the nearest polling PDU to a STATUS PDU.

The QoE analyzer 304 may perform analysis at individual layers and support cross-layer analysis, such as the application, transport, network, and RRC/RLC layers. For example, to help identify root causes of QoE issues at the application layer, the transport and network layer behavior may be examined to identify a critical path of the application layer delay and pinpoint the bottlenecks. In some instances, the QOE analyzer 304 may first identify the start and end time of a user-perceived latency problem logged in the AppBehaviorLog, which forms a QoE window. The QOE analyzer 304 may then perform analysis on the network traffic which falls into this QoE window, and use flow analysis to identify the TCP flows responsible for the application layer delay. Through this cross-layer analysis, QoE metrics may be determined to analyze, for example, the initial loading time for the media streaming application 232. In these instances, the initial loading time may be otherwise indistinguishable from rebuffering events when network data is analyzed alone.

The QoE analyzer 304 may enable understanding of the impact of interactions between the transport/network and the cellular radio link layers by supporting cross-layer analysis between transport/network layer and RRC layer. From the RRC state information logged by QxDM, the QoE analyzer 304 may obtain the RRC state change information. By finding an overlap between the QoE window and the RRC state transition window, the QoE analyzer 304 may facilitate identification of cases where RRC state transitions occur during the period of the user-perceived latency to reveal the impact of RRC state transitions on the user-perceived latency.

The QoE analyzer 304 may also facilitate analysis on how network packets are transmitted in a lower layer by supporting the mapping from IP packets to RLC PDUs using the RLC transmission information. For example, a portion or complete IP packets may be mapped to the corresponding fragmented RLC payload data bytes spreading among several PDUs. In some instances, a predetermined amount of first payload bytes may be logged to provide information to identify the corresponding IP packet. For example, the first two payload bytes are captured, and the rest of the PDU may be ignored.

Figure 4:
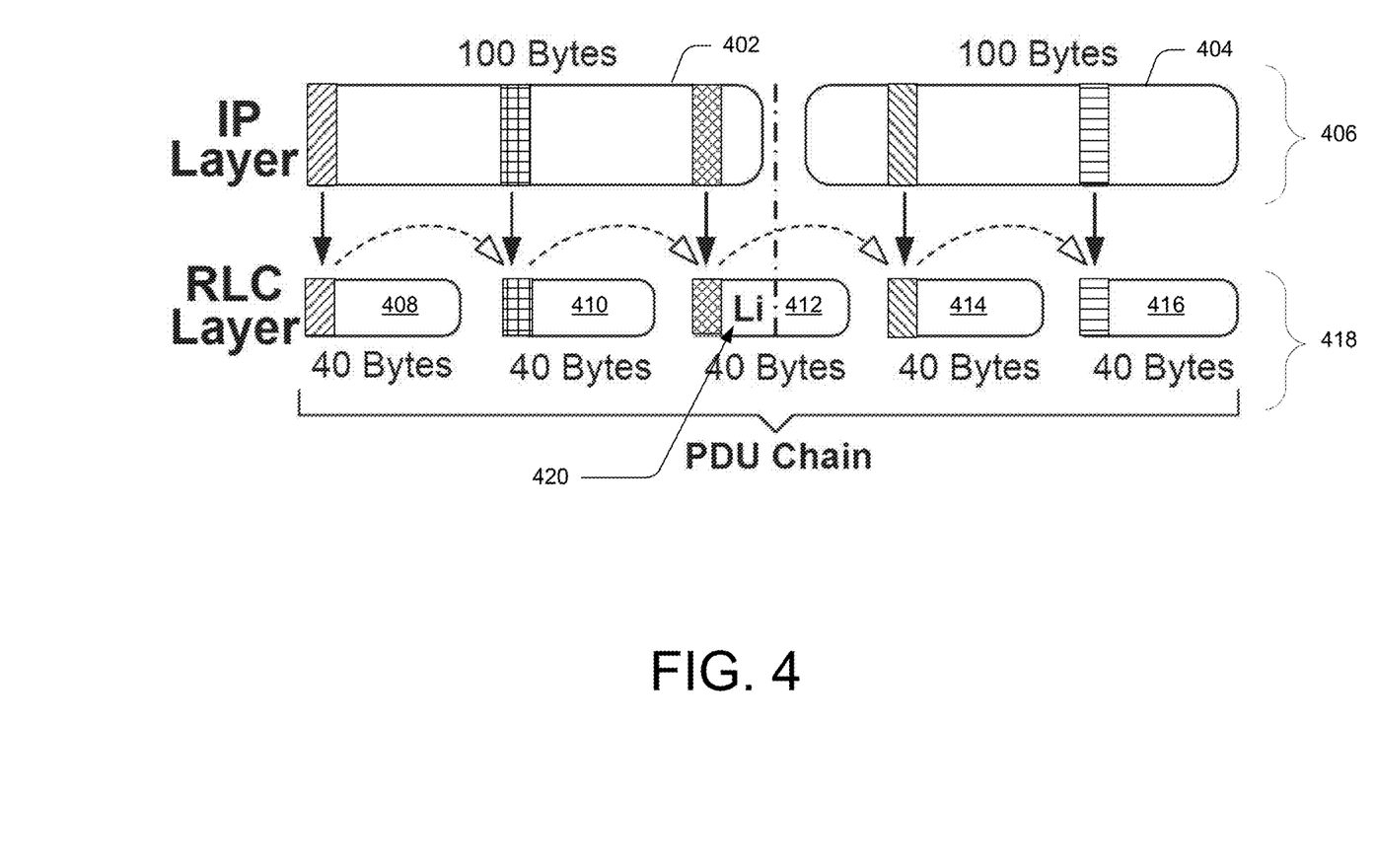
FIG. 4 is a schematic diagram of an illustrative example of a mapping algorithm for cross-layer QoE diagnosis and analysis of an application in a wireless communication.

FIG. 4 is a schematic diagram of a mapping algorithm for cross-layer mapping. The mapping algorithm may be implemented by the QoE analyzer 304. The mapping algorithm may perform cross-layer mapping, for example, from IP packets 402 and 404 in the IP layer 406 to a RLC chain of PDUs 408-416 of the RLC layer 418. As shown, the payload of the third PDU 414 is a combination of a tail of the first IP packet 402 and a head of the second IP packet 404, as PDUs may contain the payload data belonging to two consecutive IP packets. Thus, if a size of a remainder portion of a IP packet cannot fulfill the largest size of a PDU, then the RLC protocol may concatenate a part of the next IP packet to fill the rest of the space using a length indicator (LI) in a RLC PDU header, as illustrated by the LI 420 of the PDU 414. In this way, if the cumulative mapped index equals the size of the IP packet, a mapping may be determined. The mapping of the IP packets to the RLC PDUs may provide the QoE analyzer 304 with visibility into how network packets are transmitted from the IP layer 406 to the RLC layer 418. The QoE analyzer 304 may use this visibility (e.g., a mapping score) to detect problems in the cross-layer transmission of data. For example, data loss as manifested by a low mapping score may indicate a software error and/or hardware error associated the one or more of the layers.

Figure 5:
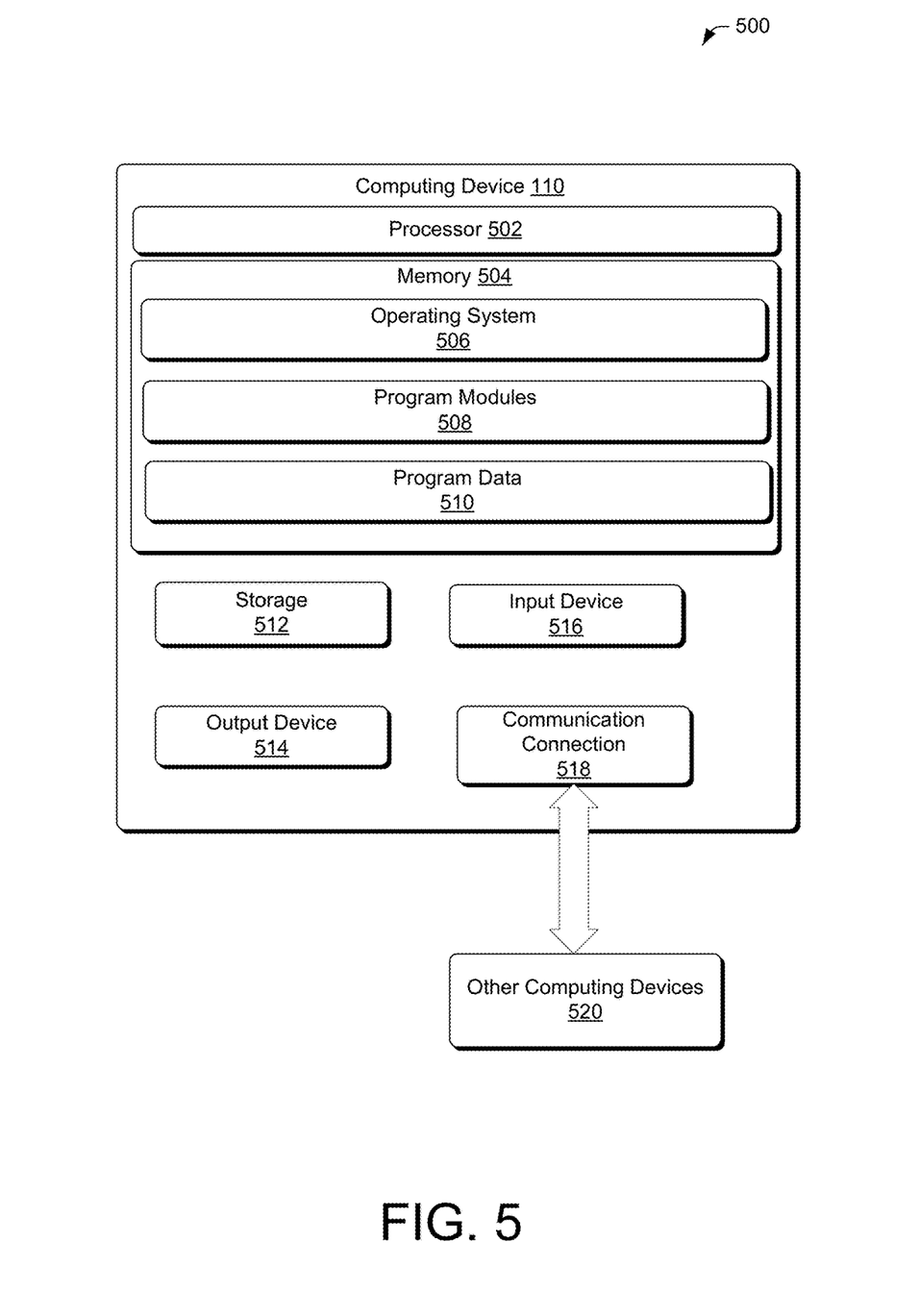
FIG. 5 is a schematic diagram of an illustrative computing architecture that facilitates QoE diagnosis and analysis of an application in a wireless communication.

FIG. 5 is a schematic diagram of an illustrative computing architecture 500 that facilitates QoE diagnosis and analysis of an application in a wireless communication. The computing architecture 500 shows additional details of at least one portion of the computing device 110, which may include additional modules, kernels, data, and/or hardware.

In various implementations, the computing device 110 may include at least one processing unit 502 and system memory 504. Depending on the exact configuration and type of computing device, system memory 504 may be volatile, such as RAM, non-volatile, such as ROM, flash memory, or some combination of the two. The system memory 504 may store an operating system 506, one or more program modules 508, and may include program data 510.

The computing device 110 may further include additional data storage devices (removable and/or non-removable) such as, for example, magnetic disks, optical disks, or tape. Such additional storage is illustrated in FIG. 5 by storage 512. Computer storage media may include volatile and nonvolatile, removable and non-removable media implemented in any method or technology for storage of information, such as computer readable instructions, data structures, program modules, or other data. The system memory 504 and storage 512 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 110. Any such computer-readable storage media may be part of the computing device 110.

In various implementation, any or all of the system memory 504 and the storage 512 may store programming instructions which, when executed, implement some or all of the above-described operations of the computing device 110, or other components described in the environment 100 shown in FIG. 1.

The computing device 110 may further have input device(s) 514, such as a keyboard, a mouse, a touch-sensitive display, voice input device. Output device(s) 516, such as a display, speakers, and a printer may further be included. The computing device 110 may further contain communication connections 518 that allow the device to communicate with other computing devices 520.

In various implementations, the computing device 110 may be configured to communicate and exchange data with the user device 102. The computing device 110 may receive the data 112 and perform root-cause analysis cross multi-layers of the protocol stack of the user device 102. In some embodiments, the computing device 110 may take into consideration one or more additional factors while performing the root-cause analysis. These additional factors may include performance metrics of the computing device 110. Such factors may include processor speed, data storage capacity, system resource availability, etc. Other factors may be the performance metrics of a communication connection used by the computing device while the computing device is communicating with servers of a social media website, a multimedia streaming service, etc. The performance metrics may include network bandwidth, data throughput speed, server load, and/or so forth. The computing device 110 may also transmit the return result 118 to the user device 102. For example, the return result 118 may include a recommendation for resolving QoE issues and/or a representation of the collected QoE metrics. The recommendation may be a recommendation to terminate the execution of other applications on the computing device 102, delete data from a data store of the computing device, connect to a communication network with more data throughput, etc.

Illustrative Processes

Figure 6:
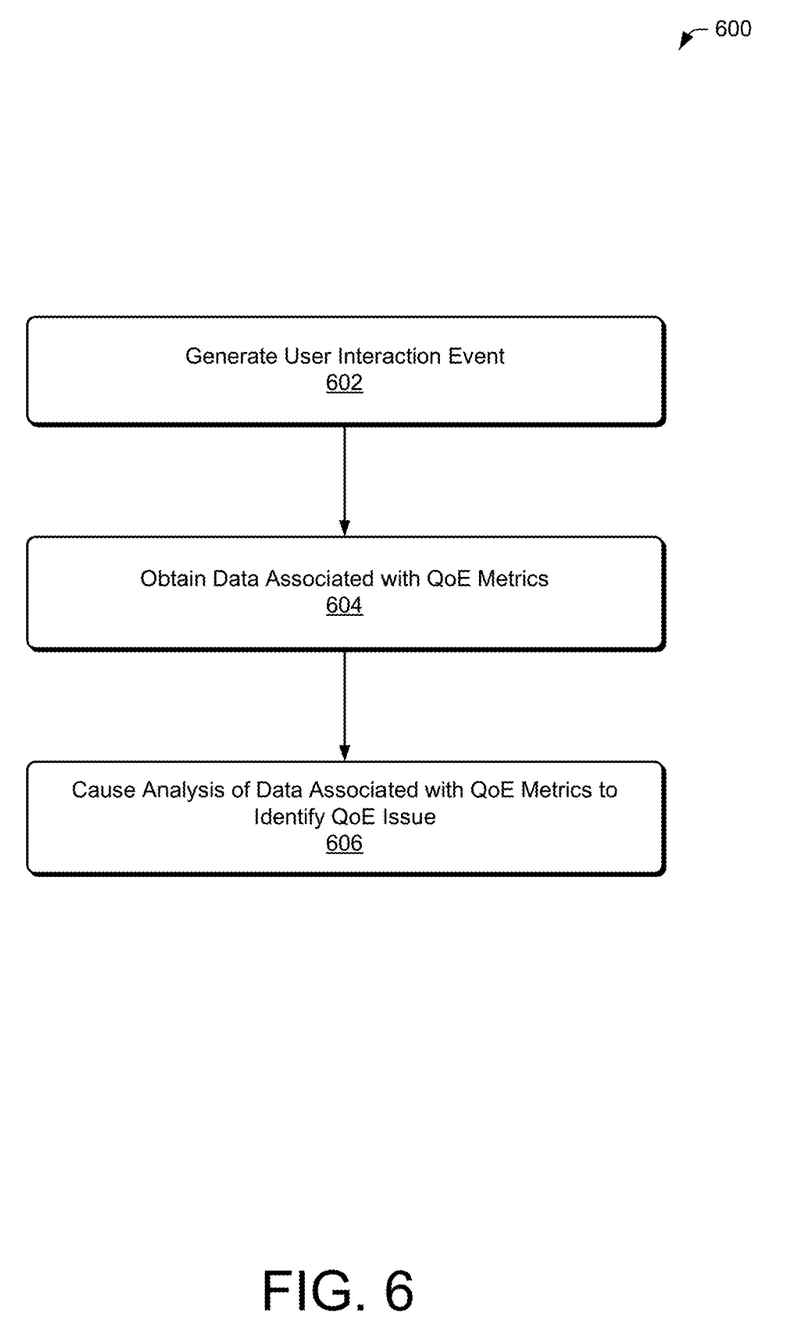
FIG. 6 is a flow diagram of an illustrative process for measuring and analyzing QoE of an application in a wireless communication.

FIG. 6 is a flow diagram of an illustrative process 600 for measuring and analyzing QoE of an application in a wireless communication. The process 600 is illustrated as a collection of blocks in a logical flow graph, which represent a sequence of operations that may be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process. The process 600 is described with reference to the computing environment 100, as well as the computing architectures 200 and 500 and the computing scheme 300. However, the process 600 may be implemented in other environments, and/or computing architecture.

At 602, the one or more processors of the user device 102 may generate the user interaction event 116 associated with the user device 102 engaged in a wireless communication. For example, the user interaction event 116 may include an action or occurrence indicating that one or more user interactions have happened on the user device 102, such as a keystroke or a mouse click.

At 604, the one or more processors may collect data associated with one or more QoE metrics at one or more layers of a protocol stack of the user device 102. In some embodiments, the QoE metrics may include various QoE metrics at one or more abstraction levels of a communication protocol stack of the user device 102. In some embodiments, the QoE application 234 may simulate the user interaction and measure the user-perceived latency corresponding to the user interaction based on a time associated with the UI response.

In some embodiments, a QoE metric may include a user-perceived latency at an application layer of the user device 102. The user-perceived latency may include the time that the user 104 spends waiting for a UI response from an application of the applications 206 in response to the user interaction event 116. In some embodiments, the QoE metrics may include cellular data consumption by the user device 102 corresponding to the user interaction event 116, and/or energy consumption by the user device 102 corresponding to the user interaction event 116. The energy consumption may include an amount of energy usages by an application of the applications 206 or the user device 102.

At 606, the one or more processors may cause an analysis of the collected data to identify one or more QoE issues. For example, the one or more processors may perform preliminary analysis on the data to identify the one or more QoE issues, and/or transmit the data to the computing device 110 to perform root-cause analysis cross multilayers of the protocol stack of the user device 102. For example, the one or more processors may cause analysis of the data that includes the one or more QoE metrics in the application layer and transport layer of the protocol stack of the user device 102.

In some embodiments, the one or more processors may generate a recommendation for resolving QoE issues, or generate a representation of the one or more QoE metrics. The one or more processors may determine, based on the one or more QoE metrics, a QoE score for performance of the application in response to the user interaction event 116, and generate a notification in response to a determination that the QoE score is less than a predetermined value.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method comprising:
    generating, by one or more processors of a user device that is engaged in a wireless communication with another computing device and via a user interface (UI) controller application resident on the user device that accesses a UI layout tree of an application on the user device, a user interaction event associated with the application, the user interaction event corresponding to a user interaction with the user device;
    in response to generating the user interaction event and prior to collecting data associated with one or more quality of experience (QoE) metrics, disabling additional applications, other than the application, that reside on the user device;
    collecting, by the one or more processors, data associated with the one or more QoE metrics across a plurality of layers of a protocol stack of the user device, the plurality of layers including an application layer and a data link layer;
    analyzing the data associated with the one or more QoE metrics to identify one or more QoE issues;
    determining that at least one QoE issue of the one or more QoE issues corresponds to a user-perceived latency associated with the user interaction event, based at least in part on analysis of the data; and
    performing a cross-layer analysis of the data associated with the plurality of layers to determine a root cause of the at least one QoE issue.

2. The method of claim 1, wherein the application is associated with a media streaming, and further comprising:
    determining a re-buffering ratio associated with the media streaming, based at least in part on the one or more QoE metrics;
    determining that the user-perceived latency is based at least in part on the re-buffering ratio; and
    generating a recommendation to increase a size of a multimedia data buffer associated with the media streaming, based at least in part on the re-buffering ratio and the user-perceived latency.

3. The method of claim 1, wherein generating the user interaction event comprises:
    simulating the user interaction on the application; and
    measuring the user-perceived latency associated with the user interaction based on a time of a user interface (UI) response.

4. The method of claim 1, further comprising:
    transmitting the data associated with the plurality of layers to a computing device to perform the cross-layer analysis.

5. The method of claim 1, further comprising:
    generating a recommendation to resolve the at least one QoE issue, based at least in part on performance of the cross-layer analysis.

6. The method of claim 1, wherein the one or more QoE issues are associated with at least one of an application development of the application, a configuration of the application, a configuration of a network associated with the wireless communication, or a configuration of the user device.

7. The method of claim 1, wherein the data associated with the one or more QoE metrics comprises a start time of the user interaction event and an end time of the user interaction event.

8. The method of claim 1, further comprising:
    determining, based on the one or more QoE metrics, a QoE score for performance of the application in response to the user interaction event; and
    generating a notification in response to a determination that the QoE score is less than a predetermined value.

9. The method of claim 1, wherein the user-perceived latency is further based at least in part on a stall time associated with a stall of the application during the user interaction event.

10. The method of claim 1, further comprising:
- determining, by the one or more processors, that a multiple number of stalls of the application occur during the user interaction event, based at least in part on analysis of the data associated with the one or more QoE metrics, and
- wherein, determining that the at least one QoE issue corresponds to the user-perceived latency associated with the user interaction event, is based at least in part on the multiple number of stalls of the application during the user interaction event.

11. One or more non-transitory computer-readable media storing computer-executable instructions that, when executed on one or more processors, causes the one or more processors to perform acts comprising:
- generating, via a user interface (UI) controller application resident on a user device that accesses a UI layout tree of an application on the user device, a user interaction event associated with an execution of the application on the user device, the user device engaged in a wireless communication;
- in response to generating the user interaction event, collecting data associated with one or more QoE metrics across a plurality of layers of a protocol stack of the user device, the plurality of layers including an application layer and a data link layer;
- analyzing the data associated with the one or more QoE metrics to identify one or more QoE issues;
- determining that at least one QoE issue of the one or more QoE issues corresponds to a network energy consumption associated with the application executed on the user device, based at least in part on analysis of the data; and
- performing a cross-layer analysis of the data associated with the plurality of layers to determine a root cause of the at least one QoE issue.

12. The one or more non-transitory computer-readable media of claim 11, wherein the one or more QoE issues further include a user-perceived latency associated with the user interaction event, the user-perceived latency being associated with a post uploading time associated with a social media communication.

13. The one or more non-transitory computer-readable media of claim 11, wherein the acts further comprise:
- monitoring a plurality of user interactions on the application; and
- collecting data associated with the one or more QoE metrics that corresponds to the plurality of user interactions.

14. The one or more non-transitory computer-readable media of claim 11, wherein the acts further comprise:
- parsing a packet trace file to extract one or more transmission control protocol (TCP) flows associated with the application; and
- calculating cellular data consumption of the application on the user device based on the one or more TCP flows.

15. The one or more non-transitory computer-readable media of claim 14, wherein the acts further comprise:
- collecting information that identifies at least a first point in time for transmission of a polling request associated with execution of the application on the user device and a second point in time associated with receipt of a status protocol data unit (PDU) that corresponds to the polling request, and
- wherein, determining the network energy consumption associated with the application is based on the information associated with transmission of the polling request and receipt of the status PDU.

16. The one or more non-transitory computer-readable media of claim 15, wherein the acts further comprise:
- prior to collecting the information, disabling additional applications other than the application that resides on the user device.

17. The one or more non-transitory computer-readable media of claim 11, wherein the plurality of layers of the protocol stack of the user device further comprise a session transport layer of the user device.

18. The one or more non-transitory computer-readable media of claim 17, wherein the data link layer comprises at least one of a radio resource control (RRC) layer or a radio link control (RLC) layer of the protocol stack of the user device.

19. The one or more non-transitory computer-readable media of claim 17, wherein the acts further comprise:
- analyzing data associated with the one or more QoE metrics in the application layer and transport layer of the protocol stack of the user device.

20. The one or more non-transitory computer-readable media of claim 11, wherein the acts further comprise:
- transmitting the data to a computing device to perform the cross-layer analysis of the data associated with the plurality of layers.

21. A user device comprising:
- one or more processors; and
- memory to maintain a plurality of components that are executable by the one or more processors, the plurality of components comprising:
  - a Quality of Experience (QoE) application configured to:
    - simulate, via a user interface (UI) controller application resident on the user device that accesses a UI layout tree of an application on the user device, a user interaction event associated with the application, the application being engaged in a wireless communication,
    - in response to simulation of the user interaction event, collect data associated with one or more QoE metrics across a plurality of layers of a protocol stack of the user device, the plurality of layers including an application layer and a data link layer,
    - cause an analysis of the data to determine that at least one QoE issue of one or more QoE issues corresponds to a network energy consumption associated with the application being executed on the user device, and
    - perform a cross-layer analysis of the data associated with the plurality of layers to determine a root cause of the at least one QoE issue.

22. The user device of claim 21, wherein the one or more QoE issues further include a user-perceived latency that is associated with at least one of a post uploading time associated with a social media communication, a web page loading time, an initial loading time associated with a media streaming, or a re-buffering time associated with the media streaming.

23. The user device of claim 22, wherein the QoE application is further configured to:
- measure the user-perceived latency corresponding to the user interaction event based on a time associated with a user interface response.

24. The user device of claim 21, wherein the QoE application is further configured to:
- perform a preliminary analysis of the data to identify the one or more QoE issues, and
- wherein, to cause the analysis of the data to determine that the at least one QoE issue corresponds to the network energy consumption associated with the application being executed on the user device is based at least in part on the preliminary analysis.

25. The user device of claim 21, wherein the one or more QoE issues are associated with at least one of an application development of the application, a configuration of the application, a configuration of a network associated with the wireless communication, or a configuration of the user device.

26. The user device of claim 21, wherein the QoE application is further configured to:
- collect information that identifies at least a first point in time for transmission of a polling request associated execution of the application on the user device, and
- wherein, to determine that at least one QoE issue corresponds to the network energy consumption is based at least in part on the information associated with transmission of the polling request.

* * * * *